(12) United States Patent
Pimentel

(10) Patent No.: US 12,471,587 B2
(45) Date of Patent: Nov. 18, 2025

(54) SYSTEM OF EXTENDIBLE ADHESIVE-BASED INSECT AND PEST ENTRAPMENT APPARATI

(71) Applicant: Jenny Pimentel, Denver, CO (US)

(72) Inventor: Jenny Pimentel, Denver, CO (US)

(*) Notice: Subject to any disclaimer, the term of this patent is extended or adjusted under 35 U.S.C. 154(b) by 0 days.

(21) Appl. No.: 19/220,642

(22) Filed: May 28, 2025

(65) Prior Publication Data

US 2025/0338838 A1    Nov. 6, 2025

Related U.S. Application Data

(63) Continuation-in-part of application No. 19/121,207, filed as application No. PCT/US2024/022629 on Apr. 2, 2024.

(60) Provisional application No. 63/512,621, filed on Jul. 8, 2023.

(51) Int. Cl.
*A01M 1/14* (2006.01)

(52) U.S. Cl.
CPC .................................. *A01M 1/14* (2013.01)

(58) Field of Classification Search
CPC ............ A01M 1/14; A01M 1/45; A01M 1/165
See application file for complete search history.

(56) References Cited

U.S. PATENT DOCUMENTS

| | | | | |
|---|---|---|---|---|
| 628,494 A * | 7/1899 | Schriever | ................ | A01M 1/14 |
| | | | | 43/115 |
| 3,913,259 A * | 10/1975 | Nishimura | ............... | A01M 1/02 |
| | | | | 43/121 |
| 4,168,591 A * | 9/1979 | Shaw | ...................... | A01M 1/14 |
| | | | | 43/118 |
| 4,411,093 A * | 10/1983 | Stout | ..................... | A01M 1/145 |
| | | | | 43/114 |
| 4,577,434 A * | 3/1986 | Davis | ..................... | A01M 1/16 |
| | | | | 43/115 |

(Continued)

FOREIGN PATENT DOCUMENTS

| | | | | | |
|---|---|---|---|---|---|
| EP | 1457111 A1 * | 9/2004 | ............ | A01M 1/145 |
| KR | 20140013826 A * | 2/2014 | .............. | A01M 1/02 |

*Primary Examiner* — Christopher P Ellis
(74) *Attorney, Agent, or Firm* — Colorado Venture Patents LLC

(57) ABSTRACT

The present invention relates to an adhesive cylinder/tube insect trap designed to address the challenges of traditional pest control methods. This innovative trap features a substantially cylindrical form with enclosed ends, fully enveloped in a sticky adhesive substance, capable of ensnaring various types of insects upon contact. A key aspect of the invention is the inclusion of a removable plastic cover that safeguards the adhesive layer, ensuring its potency and stickiness are preserved until the moment of use. The cylindrical design offers versatility in placement, allowing the trap to be positioned in strategic locations, including corners, cabinet interiors, beneath appliances, or adhered to vertical surfaces. The discreet form factor allows the trap to blend seamlessly into its surroundings or remain hidden from view, making it an unobtrusive presence in both residential and commercial spaces. The invention provides an effective, environmentally safe, and user-friendly solution for insect and pest entrapment, emphasizing ease of use, aesthetic discretion, and environmental safety.

16 Claims, 14 Drawing Sheets

(56) References Cited

U.S. PATENT DOCUMENTS

| | | | | |
|---|---|---|---|---|
| 4,671,010 A * | 6/1987 | Conlee | ................... | A01N 25/18 |
| | | | | 43/131 |
| 4,876,823 A * | 10/1989 | Brunetti | ................... | A01M 1/14 |
| | | | | 43/124 |
| 4,908,976 A * | 3/1990 | Dagenais | ............... | A01M 1/14 |
| | | | | 43/115 |
| 5,048,224 A * | 9/1991 | Frisch | ..................... | A01M 1/02 |
| | | | | 43/132.1 |
| 5,916,654 A * | 6/1999 | Phillips | .................... | E04D 5/12 |
| | | | | 428/40.1 |
| 6,464,821 B1 * | 10/2002 | Phillips | .................... | E04D 5/12 |
| | | | | 156/247 |
| 6,966,142 B1 * | 11/2005 | Hogsette | ............ | A01M 1/2016 |
| | | | | 43/107 |
| 6,998,133 B2 * | 2/2006 | Simpson | ................ | A01M 1/02 |
| | | | | 424/407 |
| 10,178,862 B1 * | 1/2019 | Pickrell | ................... | A01M 3/00 |
| 10,772,314 B1 * | 9/2020 | Caba | ................... | A01M 1/145 |
| 2006/0248783 A1 * | 11/2006 | Lindquist | ............. | A01M 1/145 |
| | | | | 43/113 |
| 2013/0067795 A1 * | 3/2013 | Wesson | .............. | A01M 1/2016 |
| | | | | 43/107 |
| 2013/0067797 A1 * | 3/2013 | Aroniss | .................. | A01M 1/14 |
| | | | | 229/5.5 |
| 2019/0350184 A1 * | 11/2019 | Chang | ...................... | A61L 9/20 |
| 2021/0000099 A1 * | 1/2021 | Schmitt | ................... | A01M 1/10 |
| 2023/0371494 A1 * | 11/2023 | Zhang | ................ | A01M 23/005 |
| 2023/0380401 A1 * | 11/2023 | Di Bono | ................ | A01M 1/04 |

* cited by examiner

SYSTEM OF EXTENDIBLE ADHESIVE-BASED INSECT AND PEST ENTRAPMENT APPARATI

CROSS REFERENCE TO RELATED APPLICATIONS

This application is a continuation in part of and claims the benefit of U.S. patent application Ser. No. 19/121,207, filed on Apr. 15, 2025, which is a national phase of International Patent Application No. PCT/US24/22629, filed Apr. 2, 2024, which claims the benefit of U.S. Provisional Patent Application No. 63/512,621, filed Jul. 8, 2023, the entire contents of each of which are hereby incorporated by reference in their entireties.

FIELD OF THE INVENTION

The present invention pertains to the field of pest control devices, specifically to an apparatus designed for the entrapment and extermination of insects. The invention falls under the category of non-toxic trapping solutions that prioritize ease of use, environmental safety, and discretion in residential and commercial settings.

BACKGROUND OF THE INVENTION

The field of insect control and management has long been challenged by the need to effectively trap and eliminate pests such as roaches, ants, spiders, and other crawling insects in both residential and commercial settings. Traditional methods have employed various forms of traps, including flat or square sticky traps with adhesive surfaces, gels for filling crevices, and tubular devices with internal adhesive bands. However, these conventional solutions often present limitations in terms of placement versatility, aesthetic discretion, and ease of use.

Prior art in the realm of insect and pest control has predominantly featured sticky traps with flat or square configurations, where the adhesive component is applied either on the inside or the top surface. While these designs have proven somewhat effective in capturing insects, their utility is significantly constrained by their shape and the placement of the adhesive. The flat or square design necessitates that these traps be used on upright flat surfaces, such as walls or countertops, limiting their versatility. This inherent design limitation restricts the placement options available to users, often rendering the traps ineffective in areas where insects are prevalent but where flat surfaces for mounting are not available. Moreover, the visibility of such traps can be aesthetically displeasing, and their fixed positioning makes them less adaptable to the dynamic and often concealed pathways insects travel within a space. Consequently, there is a clear need for an insect trap that overcomes these limitations, offering a more flexible and discreet solution to insect control.

In addition to the limitations of flat and square sticky traps, the pest control market has offered gel-based traps as a solution for filling gaps and crevices where insects commonly infiltrate. While these gel traps serve a functional purpose by targeting hard-to-reach areas, they introduce a new set of problems. The visibility of gel applications can be unsightly, detracting from the cleanliness and overall aesthetic of a space, which is particularly undesirable in areas frequented by guests or customers. Furthermore, as the efficacy of the gel diminishes over time, it often leaves behind a residue that is not only unattractive but also necessitates a subsequent cleaning effort. This residual stickiness can attract dirt and debris, compounding the issue and increasing maintenance requirements. The labor and time involved in cleaning these residues can be significant, thus presenting a notable inconvenience for users. Therefore, there is a pressing need for an insect control solution that maintains the effectiveness of gel-based traps without their visual and residual drawbacks. The prior art, as exemplified by United States Patents U.S. Pat. Nos. 11,297,817, 5,031,354, 5,175,956, and 8,250,803, and the patent applications published as US20190200596A1, US20130312313A1, US20230301291A1, US20100043275A1, US20180295832A1, each of which is incorporated by reference in their entirety, reveals various approaches to insect trapping. These include flat structures with adhesive layers, encapsulated adhesives or attractants, tubular designs with internal adhesive bands, and corrugated panels with adhesive channels. While these designs address certain aspects of insect trapping, they often fall short in providing a discreet, versatile, and user-friendly solution.

Despite the variety of insect trapping solutions available in the market, several unmet needs persist. Many insect traps, especially those designed for domestic use, are often visible and can be unsightly, drawing unwanted attention to the presence of pests. Homeowners and businesses alike seek solutions that can blend into the environment or be hidden from view while still effectively capturing insects. There remains a need to provide a discreet trapping method that can be placed unobtrusively in various settings, from kitchen corners to behind furniture, without compromising the aesthetic appeal of the space.

Traditional traps are limited by their design to certain placements and orientations, often requiring flat surfaces for proper adherence. This limitation reduces their effectiveness in areas where insects commonly travel but where flat surfaces are not available. There remains a need for versatility in placement of insect trapping apparatuses, including on vertical surfaces or suspended positions, expanding the potential for capturing insects in their natural pathways.

Many existing traps require careful handling, either due to the exposure of adhesive surfaces or the need for cleaning after use. Users desire a solution that is simple to deploy and maintain, with minimal direct interaction with the adhesive component and no requirement for post-use cleaning. There remains a need in association with insect and pest trapping devices that the adhesive or trapping surface is exposed only when needed. Further, there remains a need for the entire pest capture unit can be disposed of after use with the captured pests, offering a low maintenance solution.

Moreover, safety concerns, particularly in households with children and pets, drive the need for non-toxic and safe insect and pest trapping methods. Chemical-based traps pose risks of exposure to harmful substances, while traditional sticky traps can inadvertently capture non-target creatures. There remains a need associated with providing a safe, adhesive-based trapping mechanism without the use of chemicals, reducing the risk to non-target species and ensuring a safer environment for all occupants.

SUMMARY OF THE INVENTION

The invention enables a novel approach to insect control with its adhesive cylinder/tube trap, featuring a design that elegantly circumvents the constraints of traditional flat or square sticky traps and the unsightly nature of gel-based solutions. Aspects of the invention comprise a cylindrical tube with closed ends enveloped in a sticky adhesive, endowing it with the versatility to be placed in an array of strategic locations. Its discreet form allows it to blend seamlessly into its surroundings or remain hidden from view in association with its intended uses, making it an unobtrusive presence in both residential and commercial spaces.

The adhesive coverage associated with the preferred embodiment ensures that insects and pests such as roaches are effectively entrapped upon contact, regardless of where the trap is positioned. The apparatus's design is thoughtfully considered to be discreet, allowing for placement in various nooks and crannies without drawing attention. This feature is particularly beneficial in maintaining the aesthetic appeal of the environment while still serving its functional purpose.

The substantially cylindrical aspect associated with the preferred embodiment is further enhanced with a removable plastic cover that safeguards the adhesive until the moment of use. This cover is thoughtfully designed in the context of the preferred embodiment as a system, with a perforated cut along its side, facilitating easy removal and activation of the trap. Once the trap has served its purpose and has retained insects and/or pests to its adhesive coating, it can be disposed of effortlessly, mitigating the need for unpleasant cleaning or handling of pests.

The invention disclosed herein provides as an effective, environmentally safe, and user-friendly solution for insect and pest entrapment. It emphasizes ease of use, aesthetic discretion, and environmental safety, filling a significant gap in the pest control market. By offering a non-toxic method of trapping that can be adapted to various settings and requiring minimal upkeep, the invention represents a novel advancement associated with insect and pest management.

DETAILED DESCRIPTION OF THE INVENTION

The preferred embodiment of the invention introduces an innovative insect and pest trapping apparatus 500 designed to address the challenges and limitations of conventional pest control methods. This apparatus 500, characterized by its unique straw-shaped cylindrical form, evolves the approach to insect and pest entrapment by offering a design that is both discreet and versatile in its application. The preferred embodiment of the invention comprises a tube-like structure with enclosed ends, which is fully enveloped in a sticky adhesive substance, capable of ensnaring various types of insects upon contact. A key feature of this embodiment is the inclusion of a removable plastic cover 120 that safeguards the adhesive layer 110, ensuring its potency and stickiness are preserved until the moment of use.

Figure 1:
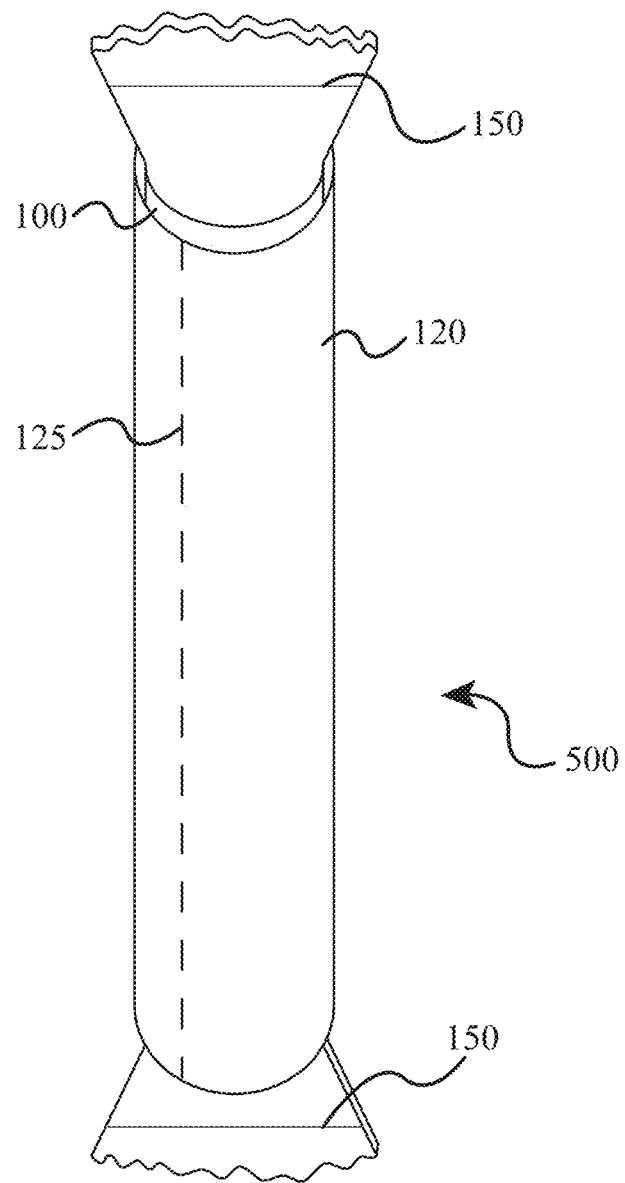
FIG. 1 shows a side view of the complete apparatus, featuring a cylindrical tube with an adhesive layer protected by a plastic cover, and sealed ends that maintain structural integrity.

The figures illustrate various aspects and embodiments of the insect trapping apparatus. FIG. 1 depicts a side view of the complete apparatus with the plastic cover 120 fully in place protecting the adhesive layer 110 on the cylindrical tube 100. The apparatus 500 shown includes sealed ends 150 to maintain structural integrity and prevent adhesive exposure.

Figure 2:
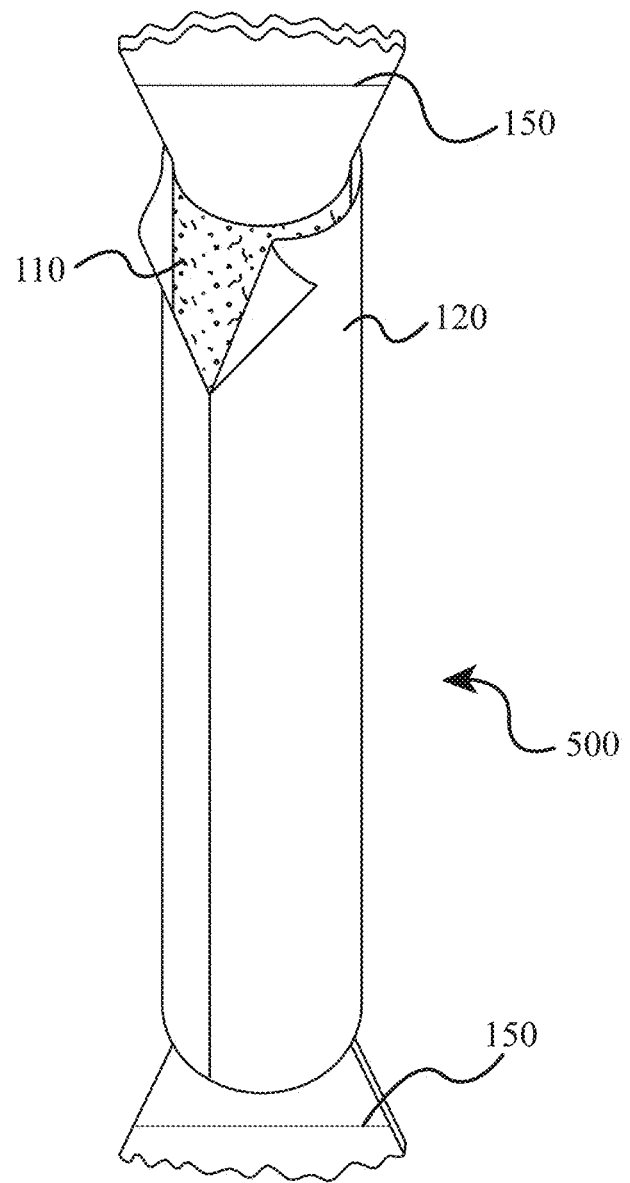
FIG. 2 depicts the apparatus with the plastic cover partially removed, demonstrating how the cover protects the adhesive layer until deployment.

FIG. 2 shows the apparatus with the plastic cover 120 partially removed, revealing the adhesive layer 110 underneath. The figure demonstrates how the cover 120 protects the adhesive layer 110 until the trap is ready for deployment.

Figure 3:
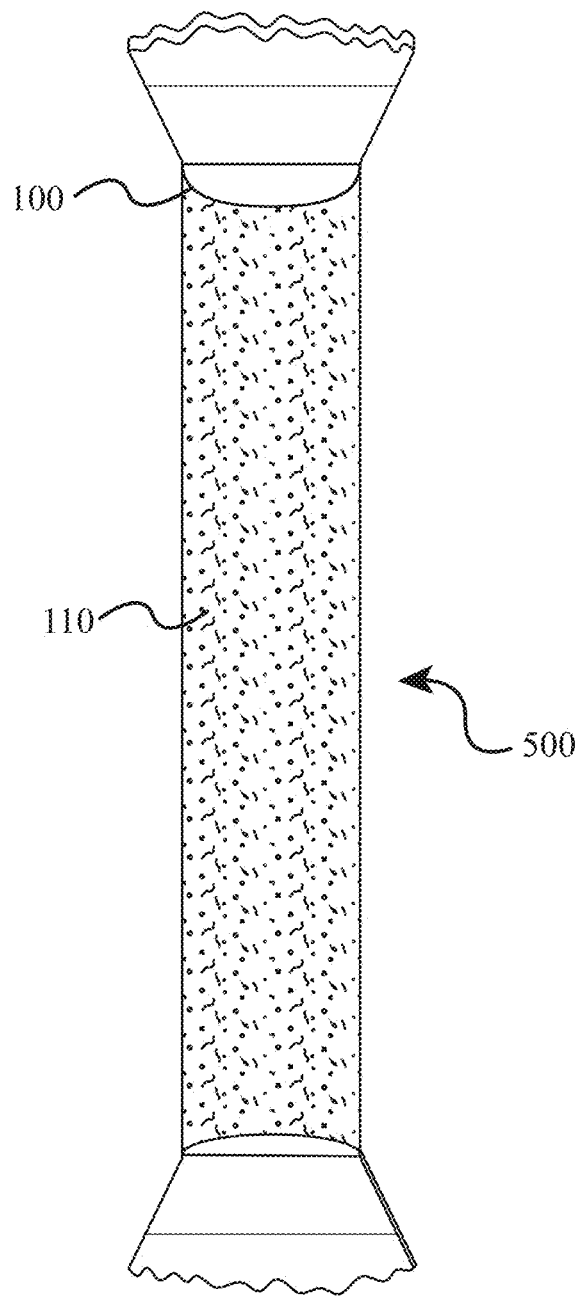
FIG. 3 shows the apparatus with the plastic cover fully removed, revealing the complete adhesive layer on the cylindrical tube's exterior surface.

FIG. 3 illustrates the apparatus 500 with the plastic cover 120 completely removed, exposing the adhesive layer 110 that covers the exterior surface of the cylindrical tube 100.

Figure 4:
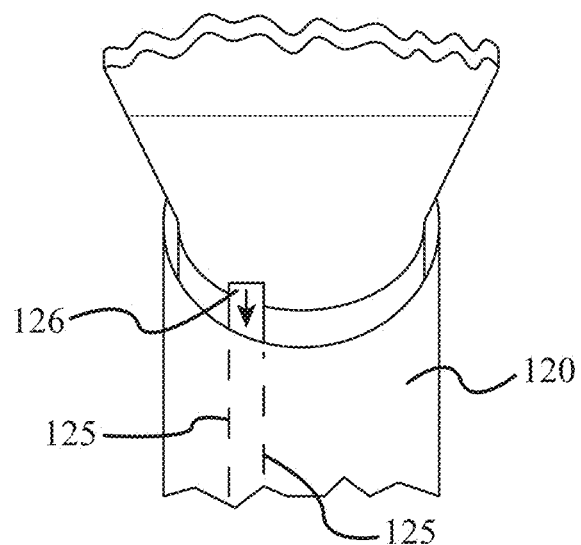
FIG. 4 illustrates the apparatus before activation, showing the plastic cover intact with unbroken perforated edges and the pull-tab in its initial position.

FIG. 4 illustrates the apparatus with the pull-tab 126 in its initial state prior to being pulled. The figure clearly shows the plastic cover 120 fully intact with the perforated edges 125 visible but unbroken, demonstrating how the apparatus appears before activation. The pull-tab 126 is shown in its original position, ready for the user to grasp in order to initiate removal of the protective plastic cover 120.

Figure 5:
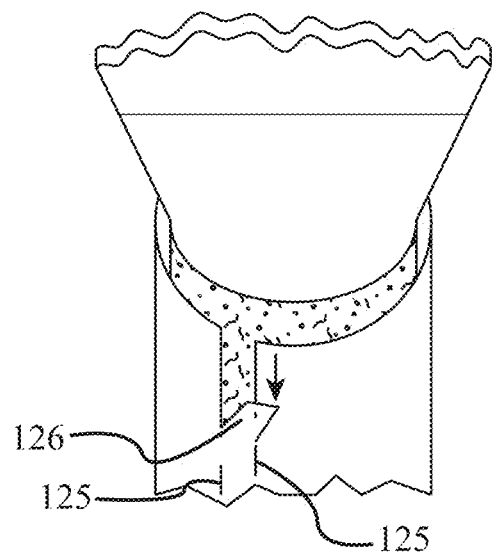
FIG. 5 shows the apparatus during activation as the pull-tab is pulled, demonstrating how the perforated edges begin separating along the tear line.

FIG. 5 demonstrates the apparatus with the pull-tab 126 after it has been pulled. The figure depicts how the perforated edges 125 have begun to separate along the tear line, showing the initial stage of the plastic cover removal process. This illustration shows the result of the user action of pulling the tab, which activates the apparatus by starting the process of exposing the adhesive layer beneath the plastic cover.

Figure 6:
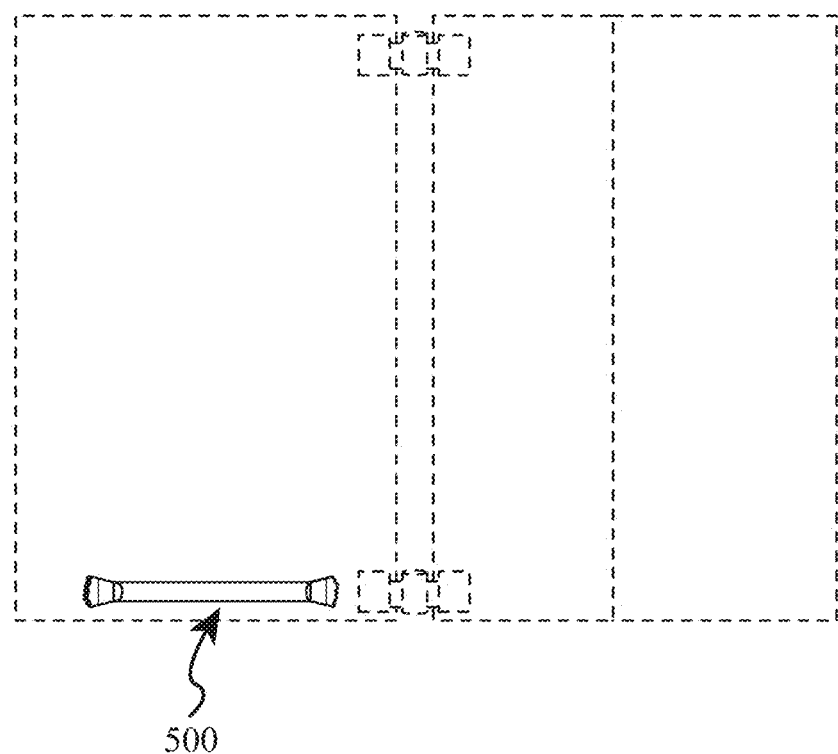
FIG. 6 demonstrates horizontal placement of the device on a cabinet door.

FIG. 6 is a front view demonstrating an exemplary horizontal placement of the device 500 in accordance with an intended use upon a cabinet door in an embodiment.

Figure 7:
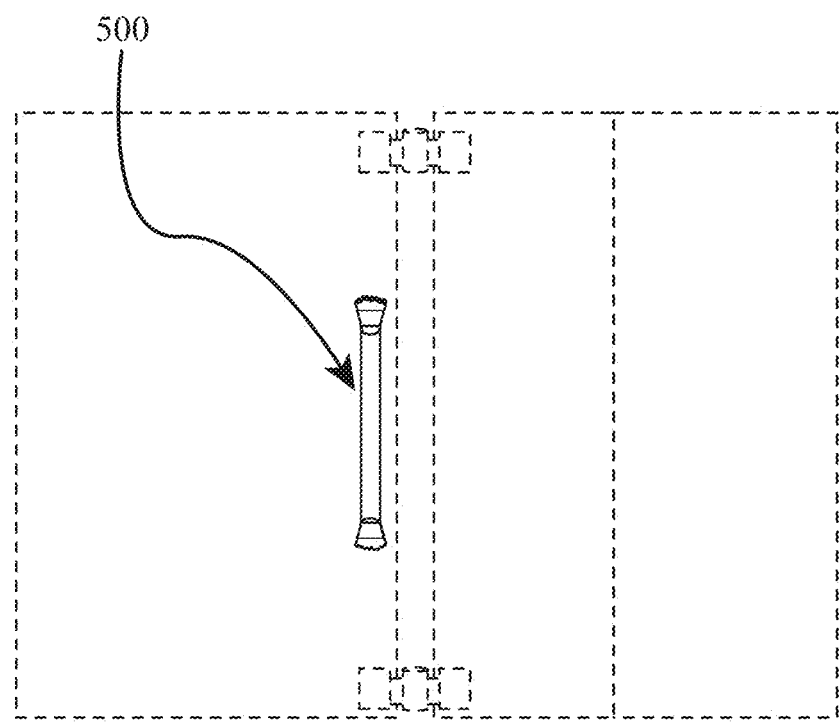
FIG. 7 shows vertical placement of the device on a cabinet door.

FIG. 7 is a front view demonstrating an exemplary vertical placement of the device 500 in accordance with an intended use upon a cabinet door in an embodiment.

Figure 8:
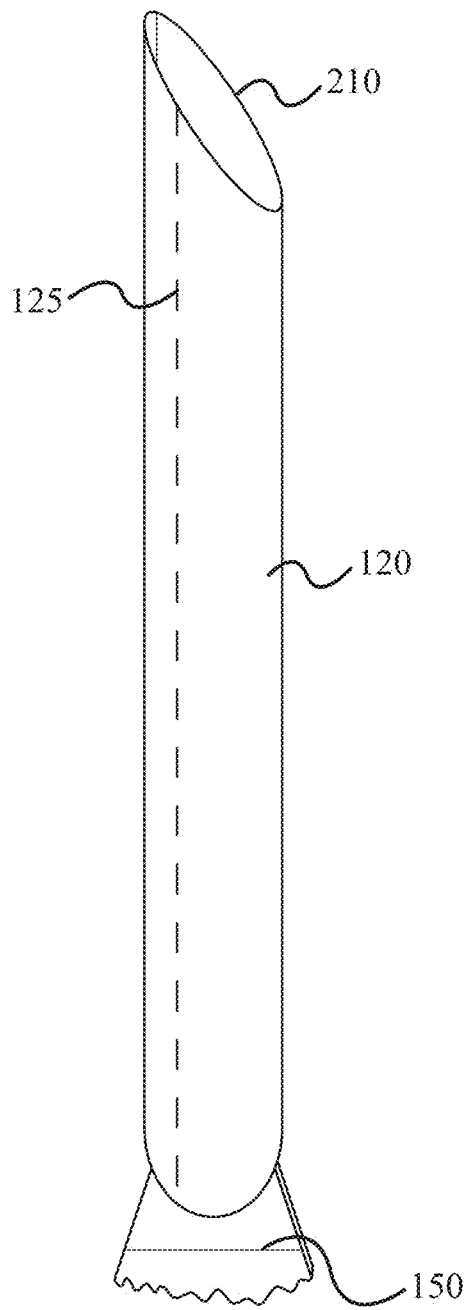
FIG. 8 depicts the apparatus with cylindrical tube featuring a 45-degree cut at its superior aspect for connection purposes, including the adhesive layer and sealed end.

FIG. 8 presents the apparatus in an embodiment with the cylindrical tube 210 having an approximately 45 degree cut at the superior aspect configured for connection, further comprising the adhesive layer 120 and sealed end 150.

Figure 9:
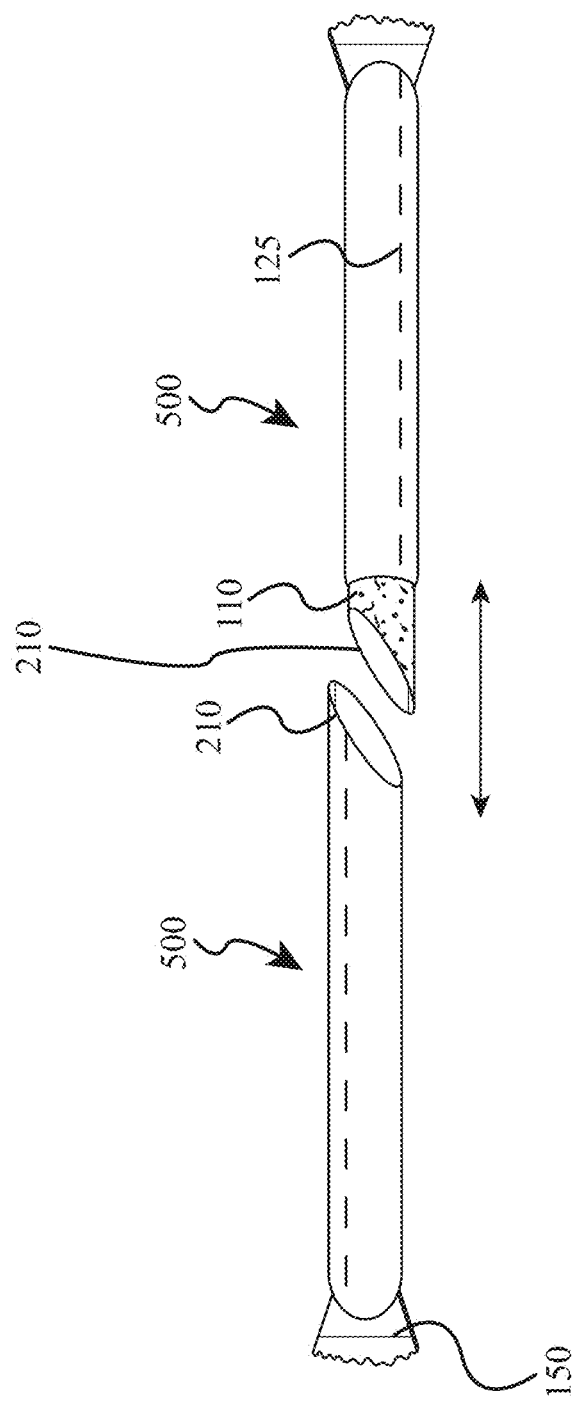
FIG. 9 shows an extended configuration with multiple tube segments, each cut at 45 degrees, arranged pre-connection with adhesive layer and sealed ends.

FIG. 9 illustrates an extended configuration of the apparatus 500, showing multiple tube segments 210 each with an approximately 45 degree cut at corresponding aspects arranged for placement prior to being connected together with numerical indicator 5, adhesive layer 110, and sealed ends 150.

Figure 10:
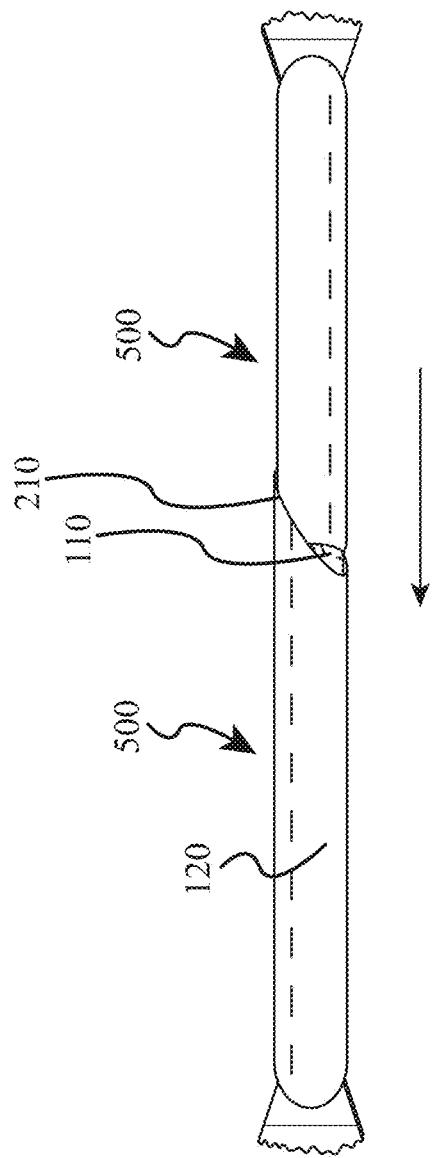
FIG. 10 illustrates connected tube segments in an end-to-end straight line configuration, showing the adhesive layer.

FIG. 10 demonstrates the apparatus with connected tube segments 210 in an embodiment, featuring the adhesive layer 110 and showing how multiple segments can be joined to create an extended trapping system in accordance with an intended end-to-end straight line embodiment.

Figure 11:
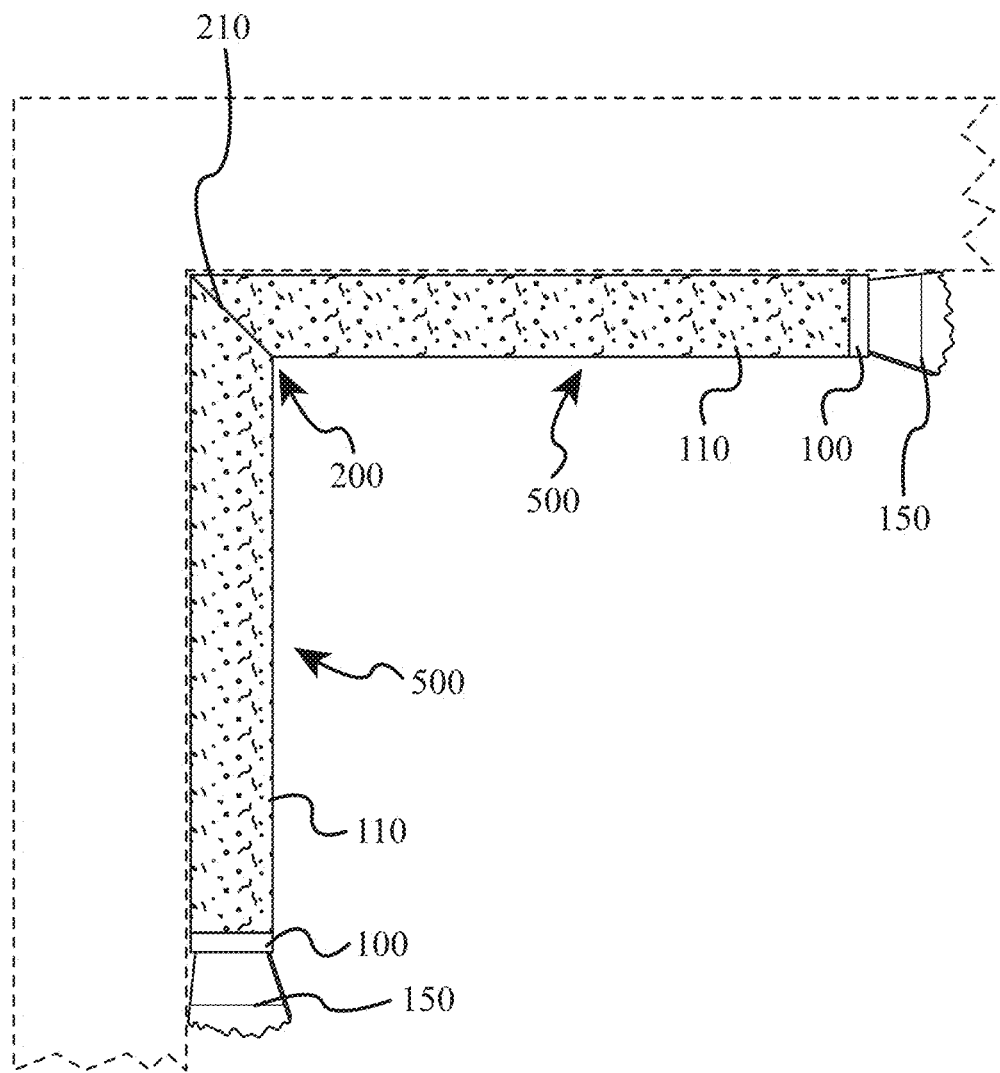
FIG. 11 demonstrates tube segments connected at right angles, featuring the adhesive layer and sealed ends.

FIG. 11 demonstrates the apparatus with connected tube segments 210 in an embodiment, featuring the adhesive layer 110 and sealed ends 150 and showing how multiple segments can be joined to create an extended trapping system in accordance with an intended right angle orientation in an embodiment.

Figure 12:
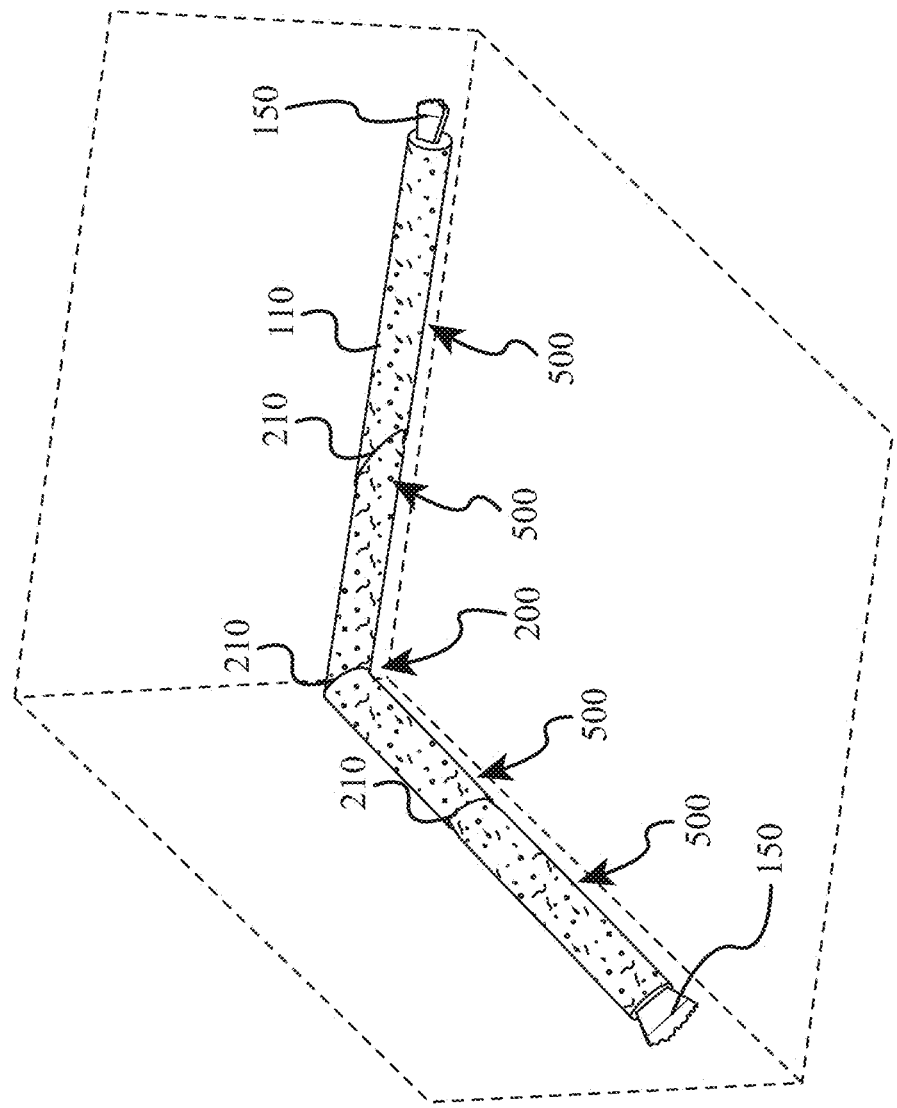
FIG. 12 shows tube segments connected in a rectangular configuration, with adhesive layer and sealed ends.

FIG. 12 demonstrates the apparatus with connected tube segments 210 in an embodiment, featuring the adhesive layer 110 and sealed ends 150 and showing how multiple segments can be joined to create an extended trapping system in accordance with an intended right angle orientation in an embodiment for placement around a rectangular aspect.

Figure 13:
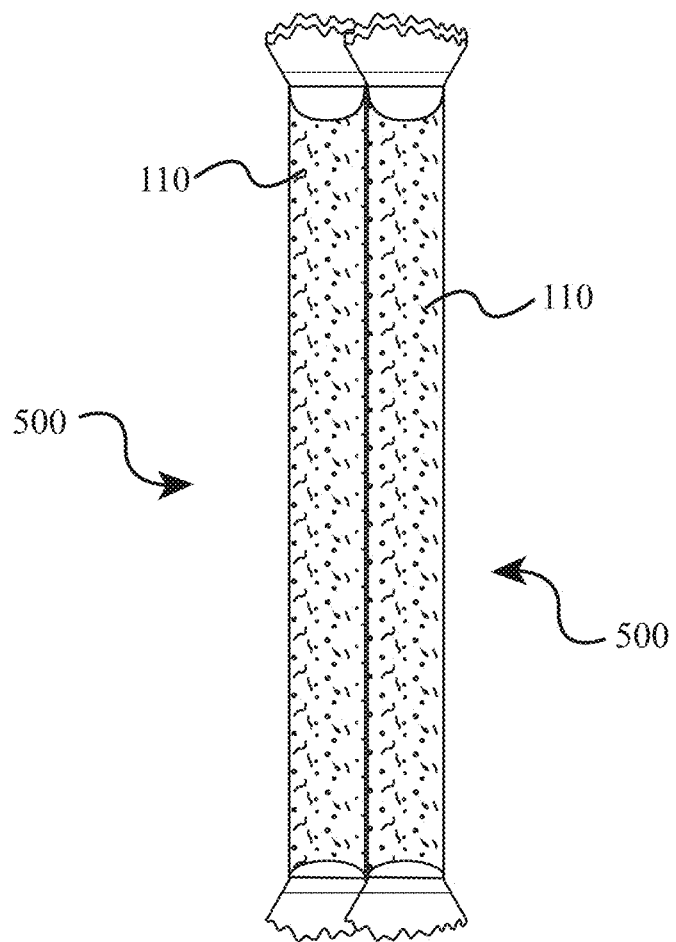
FIG. 13 illustrates parallel side-by-side oriented apparati with adhesive layer and sealed ends.

FIG. 13 demonstrates parallel side-to-side oriented apparati 500 in an embodiment, featuring the adhesive layer 110 and sealed ends 150 and showing how multiple segments can be joined to create an extended trapping system in accordance with an intended parallel side to side configuration in accordance with an embodiment.

Figure 14:
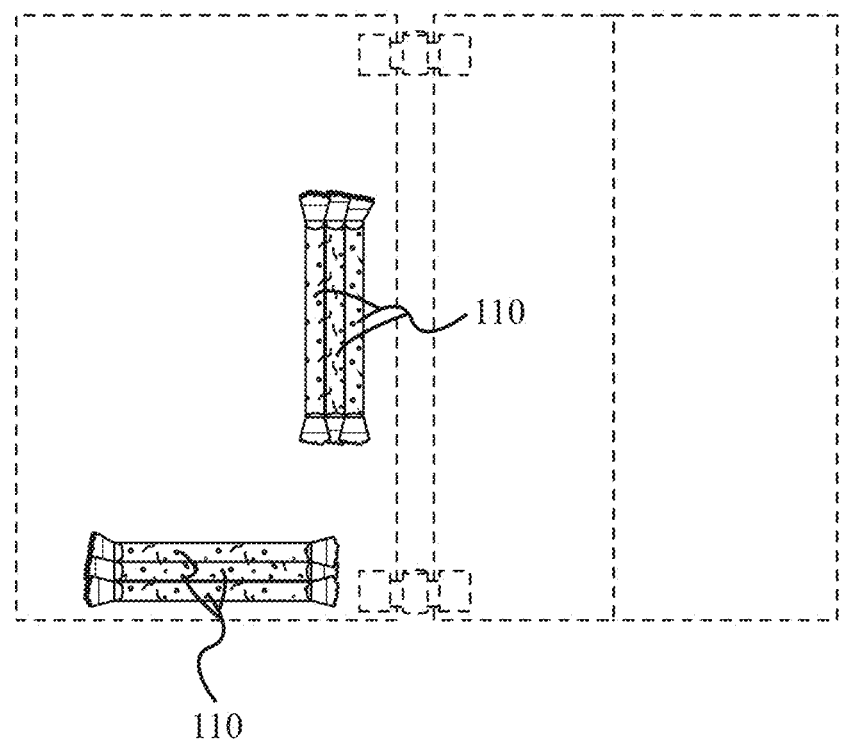
FIG. 14 demonstrates multiple parallel side-by-side oriented apparati placed in various locations, featuring the adhesive layer and sealed ends.

FIG. 14 demonstrates multiple parallel side-to-side oriented apparati 500 in an embodiment, featuring the adhesive layer 110 and sealed ends 150 and showing how multiple segments can be joined to create an extended trapping system in accordance with an intended parallel side to side configuration and placed in multiple locations in accordance with an embodiment.

Unlike traditional flat or square sticky traps that are limited to placement on upright flat surfaces, the inventive apparatus 500 can be strategically positioned in a multitude of locations, including but not limited to corners, cabinet interiors, beneath appliances, or even adhered to vertical surfaces as depicted in FIGS. 4 & 5. This flexibility in placement is not only advantageous for capturing insects in their common routes but also allows the apparatus 500 to be concealed from view in association with intended uses, maintaining the aesthetic integrity of the environment in which it is deployed.

The inventive aspects associated with the preferred embodiment address the need for discretion through its cylindrical tube design, which inherently offers a more subtle and less obtrusive presence compared to traditional flat or square sticky traps. The tubular shape of the invention allows it to be placed in a variety of locations without drawing attention to itself, blending seamlessly with the environment. The present inventor has recognizes that this discreet form factor is particularly advantageous in settings where visual appeal is important, such as in residential homes, hospitality venues, or retail spaces.

The cylindrical tube 100 is designed with a compact diameter, making it small enough to be positioned unobtrusively along baseboards, behind furniture, under appliances, or within plant pots. Its rounded profile minimizes the visual footprint, allowing the trap to become virtually invisible when viewed from certain angles. The tube 100 can also be tucked away in discreet locations where pests are known to traverse but are less likely to be noticed by occupants or visitors, such as behind door frames, within utility closets, or along window sills.

In association with an exemplary implementation, to further enhance the discreet nature of the invention, the exterior surface of the tube 100, which is coated with an adhesive layer 110, can be colored or patterned to match common household materials like wood, tile, or carpet. This camouflage effect allows the trap to blend into the background, reducing visual detection while still effectively capturing insects that come into contact with it.

Additionally, the sealed ends of the tube 100 ensure that the adhesive layer 110 does not extend beyond the trapping surface, maintaining a clean and tidy appearance. The lack of exposed adhesive layer 110 contributes to the discreet profile of the trap in its preferred embodiment, as there are no messy or sticky edges that might otherwise catch the eye or adhere to unintended objects.

The preferred embodiment facilitates easy disposal, allowing users to discard the entire unit after it has served its purpose, thus eliminating the need for post-use cleaning or handling of trapped insects or other pests. The choice of materials for the cylindrical or tubular aspect of the apparatus 500, including options such as polymers, paper, organic, or inorganic substances, caters to diverse user preferences and environmental considerations, further enhancing the appeal of the invention.

The preferred embodiment's straw-shaped design with enclosed ends presents a significant advancement over prior art by offering a trapping device that is not only effective but also discreet and adaptable to various settings. The removable plastic cover 120 is a novel addition that addresses the common issue of adhesive layer 110 exposure and degradation in existing traps, ensuring that the adhesive layer 110 remains effective until the point of application. This feature alone sets the preferred embodiment apart from prior art, providing a clear advantage in terms of maintaining the functionality and efficacy of the trap.

Moreover, the preferred embodiment's adaptability in terms of materials used for construction allows for an environmentally friendly approach to pest control, a consideration that is increasingly important to modern consumers. The ability to customize the length of the adhesive layer 110 and cylinder further underscores the preferred embodiment's superiority over prior art, as it offers a level of personalization and flexibility in use that is unmatched by traditional insect traps.

The construction of the preferred embodiment is centered around a cylindrical tube 100 that serves as the core structure for the insect trapping apparatus 500. This tube 100 is fabricated from durable and lightweight materials, such as cardboard, plastics, and/or high-density polymers, which provide the necessary rigidity while allowing for flexibility in placement. In an embodiment, the tube 100 further comprises ridges and recesses. The choice of material ensures that the tube 100 can maintain its shape and adhesive layer 110 properties under various environmental conditions, including humidity and temperature fluctuations commonly encountered in both indoor and outdoor settings.

The exterior surface of the tube 100 in the preferred embodiment is uniformly coated with a specially formulated adhesive substance forming the adhesive layer 110. This adhesive substance is selected for its long-lasting tackiness and resistance to drying out, ensuring that it remains effective over extended periods. The adhesive layer 110 is thick enough to trap insects upon contact but is designed to prevent deep embedding of the pests, facilitating easy disposal of the tube 100 once it is filled with trapped insects.

The adhesive layer 110 associated with the preferred embodiment exhibits enduring stickiness, a critical feature that ensures the trap remains active and capable of capturing insects over time without the need for frequent replacement. Suitable adhesives for use within the adhesive layer 110 for this purpose may include, but are not limited to, pressure-sensitive adhesives such as polyisobutylene or polybutene-based compounds, which are known for their persistent viscous properties and resistance to environmental factors that typically cause adhesives to lose their effectiveness. The application of the adhesive layer 110 is performed to achieve a uniform layer that is sufficiently thick to secure insects upon contact. The adhesive layer's 110 optimal thickness might range from a few microns to several millimeters, depending on the specific adhesive used and the types of insects or pests targeted. The selection of the adhesive compound for use within the adhesive layer 110 involves considering factors such as the adhesive compound's longevity, its resistance to environmental conditions, and its safety for use around humans and pets. The compounds chosen are typically pressure-sensitive adhesives that remain tacky at room temperature and do not require activation by water, solvents, or heat. These adhesives are formulated from synthetic rubber or acrylic polymers, which are known for their strong and durable bonding properties. Additionally, the adhesives are tested to ensure they do not contain substances that could be harmful if used in indoor environments, such as volatile organic compounds (VOCs) that could off-gas into living spaces.

Alternative embodiments could incorporate a range of adhesive types within the adhesive layer 110 to address specific pest control scenarios. For example, some adhesive types may be formulated to be more or less resistant to temperature variations, making them suitable for outdoor use or in environments with fluctuating temperatures. Other adhesive types might be designed to be water-resistant, allowing the traps to be used in damp areas such as bathrooms or basements without losing their stickiness. Furthermore, adhesive types with different levels of tackiness could be employed to target specific insects and pests, with some requiring a stronger bond to prevent escape.

When the adhesive layer 110 on the exterior surface of the inserted tube contacts the interior surface of the receiving tube in the telescoping arrangement, specific adhesive properties are necessary to maintain effectiveness despite compression. The adhesive should maintain at least 85% of its tackiness when subjected to the 2-5% compression that occurs during tube insertion. For optimal adhesion between the exterior and interior surfaces, the adhesive formulation should include higher levels of tackifiers (approximately 25-35% by weight) than standard formulations, and may incorporate elastomeric components such as styrene-isoprene-styrene (SIS) or styrene-butadiene-styrene (SBS) copolymers at 5-15% by weight to accommodate the deformation during insertion while maintaining adhesive properties. An overlap of at least 15-20 mm between the tubes provides sufficient adhesive contact area to create a secure connection capable of supporting the combined weight of multiple connected tube segments. The adhesive for interior-exterior bonding should have a higher initial tack value (minimum 800 g/cm$^2$ as measured by ASTM D2979) compared to standard insect-capturing formulations to ensure immediate bond formation upon insertion.

Embodiments of the invention may incorporate insect attractants within or adhered to the tubular body or on the adhesive layer 110 to enhance the trap's effectiveness. These attractants could be species-specific pheromones or general food-based scents. An embodiment could include a replaceable attractant cartridge that users can swap out to target different types of insects.

To protect the adhesive layer 110 from contamination and premature exposure, the tube 100 is encased in a removable plastic cover 120. This cover 120 is designed to conform closely to the cylindrical shape of the tube 100, providing a barrier against dust, debris, and accidental contact. The plastic cover 120 is manufactured from a non-reactive material that does not compromise the adhesive layer 110's properties and is easy to remove without leaving any residue on the adhesive layer 110 surface.

The plastic cover 120 enveloping the adhesive layer 110 covering the tube 100 serves as a protective shield until the trap is ready for use in accordance with teachings of the inventions. This cover 120 is crafted to fit snugly around the substantially cylindrical form of the tube 100, ensuring that the entire adhesive layer 110 surface is shielded from external contaminants such as dust and debris, which could otherwise diminish the adhesive layer 110's effectiveness. Additionally, the cover 120 prevents inadvertent contact with the adhesive layer 110, preserving its stickiness for when it is most needed.

The material selected for the plastic cover 120 in an embodiment must be non-reactive so as not to interact chemically with the adhesive layer 110, which could potentially alter its trapping properties. Suitable plastics for the cover 120 include polyethylene, polypropylene, and polyester films, known for their inertness and stability. These materials are also favored for their clarity, allowing users to see the adhesive layer 110 beneath and assess the trap's condition without needing to remove the cover 120. The cover 120 is designed with a perforated edge 125 or a tear strip that allows users to easily initiate the removal process.

The design of the plastic cover 120 in its preferred embodiment incorporates a user-friendly perforated edge 125 or tear strip, which serves as an initiation point for the removal process, ensuring that users can easily access the adhesive layer 110 surface of the tube 100 when needed. This perforated edge 125 is precisely engineered along the length of the cover 120, with perforations spaced at intervals that balance ease of tearing with the integrity of the cover 120 during handling and storage. The tear strip is typically a narrow section along the cover 120, created using a die-cutting process that partially cuts through the plastic material, allowing for a clean and straight tear without the need for additional tools. The placement of the tear strip is strategically positioned to be readily accessible and may feature a slight overhang or tab that users can grip between their fingers. This tab can be further enhanced with a non-slip texture or a visually contrasting color to guide the user. The combination of these features ensures that the removal of the cover 120 is a simple and intuitive process, allowing for quick preparation of the trap for use while minimizing the risk of accidental contact with the adhesive layer 110.

In association with varying embodiments, the mechanism for applying the plastic cover 120 to the tube 100 is designed for efficiency and ease of use. One common method is the use of a heat-shrink film that conforms to the tube 100's shape when heat is applied, creating a tight seal without the need for adhesives. Another approach is the use of pre-sized plastic sleeves that can be slipped over the tube 100 and sealed at one end or both ends forming a seal 150, either through heat sealing or with an adhesive strip that does not interact with the tube 100's adhesive layer 110. For user convenience, the cover 120 may incorporate a perforated tear line 150 and/or a pull-tab 126, enabling quick and clean removal. The pull-tab 126 can be an extension of the plastic cover 120 itself or a separate component affixed to the cover during the manufacturing process. As depicted in FIGS. 4 & 5, embodiments may combine the use of a pull-tab 126 with one or more perforated tear lines 125.

The application of the plastic cover 120 is typically performed during the final stages of the tube 100's production. After the adhesive layer 110 has been applied to the tube 100, the cover 120 is placed over it using automated equipment that ensures precision and consistency. The cover 120 is then secured in place, either through the aforementioned heat-shrink process or by sealing the open end, resulting in a fully enclosed, ready-to-use insect trap.

The ends of the tube 100 are sealed in association with the preferred embodiment to prevent ingress of debris and pests, and to maintain the structural integrity of the tube 100 during handling and placement. The sealed ends also contribute to the discreet appearance of the trap, as they give the tube 100 a finished look that more easily blends seamlessly into various environments. Alternative embodiments could include tubes comprising exterior surfaces that mimic common household textures or patterns, such as wood grain, tile, or fabric. These designs would allow the traps to blend into their surroundings more effectively, making them less noticeable to occupants and preserving the visual appeal of the space. The tubes 100 could also be produced in a variety of colors to match different decors, further enhancing their discreet nature.

To enable the construction of the preferred embodiment, the cylindrical tube 100 is produced using an extrusion process that allows for precise control over the tube's 100 diameter and wall thickness. The extrusion process is calibrated to produce tubes 100 with a uniform exterior surface that is optimal for adhesive layer 110 application. Once extruded, the tubes 100 are cut to standard lengths suitable for common use cases, although they can also be customized to specific lengths as required.

The dimensions of the cylindrical tube 100 in the preferred embodiment are meticulously defined to cater to a wide range of use cases while ensuring optimal functionality of the adhesive layer 110 surface. The tube's 100 diameter is typically set within a range that allows for easy handling and placement, commonly between 0.5 to 2 inches, providing a sufficient surface area for effective insect capture without being obtrusive. The wall thickness of the tube 100 is engineered to provide structural stability, generally ranging from 0.01 to 0.05 inches, which ensures the tube 100 maintains its shape during handling and when insects are ensnared. Standard lengths of the tubes 100 are determined based on typical application areas and user convenience, with common lengths being between 6 to 12 inches, allowing for adequate coverage in areas such as window sills, countertops, or along baseboards. However, for specialized applications, the tubes 100 can be extruded to custom lengths, providing versatility for unique pest control scenarios or specific spatial requirements.

An alternative embodiment includes varied sizes and shapes of the tube 100 to accommodate different spaces and target insects and pests. For instance, smaller diameter tubes 100 could be designed for trapping smaller pests like ants or fruit flies, while larger tubes 100 could be effective against bigger insects such as cockroaches or spiders. The tubes 100 could also be produced in various lengths, allowing users to cut them to size or use them as is for broader coverage. Additionally, the tubes 100 could be designed with flat sections to enable secure placement on ledges or window sills, or with flexible materials that allow them to be bent around corners or contoured surfaces without compromising the adhesive layer 110's effectiveness in alternative embodiments.

For optimal telescoping fit between tube segments, specific dimensional relationships must be maintained. The outer diameter of the inserting tube should be between 101% and 105% of the inner diameter of the receiving tube when measured at right angles to the tube axis. For the angled ends (cut between 30-60 degrees, preferably 45 degrees), this produces an effective elliptical profile that exceeds the inner diameter of the receiving tube by approximately 3-8% at its widest point, necessitating the slight compression described above. For tubes with the standard dimensions described in paragraph (diameter between 0.5 to 2 inches, wall thickness between 0.01 to 0.05 inches), the optimal wall thickness ratio between connecting tubes should be maintained at 1:1.2 to 1:1.5, with the receiving tube having the thicker wall to prevent outward deformation during insertion. Manufacturing tolerances should be maintained within +0.2 mm for diameters under 1 inch and +0.3 mm for larger diameters to ensure consistent compression and secure connections across production batches.

Further alternative embodiments feature a modular design, where the tube 100 is composed of interlocking segments that can be assembled to create a trap of the desired length. This design would offer flexibility in trap size while minimizing waste, as users could disassemble and reuse segments as needed. The interlocking mechanism would be designed to maintain the structural integrity of the tube 100, ensuring that the adhesive layer 110 surface remains continuous and effective along the entire length of the assembled trap.

The compression capability of the tube material is a critical feature for enabling the telescoping connection between tube segments. For optimal compression without structural failure, the cylindrical tube material should have a Shore D hardness between 60-80 for rigid polymers such as polypropylene or high-density polyethylene, or Shore A hardness between 75-95 for more flexible materials such as low-density polyethylene or flexible PVC. When using polymeric materials, the optimal elastic modulus ranges from 0.8 GPa to 2.5 GPa, allowing for approximately 2-5% compression when inserted into a receiving tube while maintaining structural integrity. Among the construction materials listed herein, polymers such as polyethylene, polypropylene, and flexible PVC exhibit these preferred compression characteristics. However, paper-based or organic materials listed herein may require additional treatment, such as wax impregnation or polymer coating, to achieve the necessary compression resilience while maintaining the ability to form a secure connection.

The application of the adhesive layer 110 substance onto the exterior surface of the tube 100 is performed during the manufacturing process of the trap in association with the preferred embodiment. To achieve a consistent and uniform coating, a controlled coating process is employed. This process may involve the use of precision equipment such as automated adhesive dispensers that apply a steady stream of adhesive as the tube 100 rotates, ensuring that the entire exterior surface is covered evenly. The rate of adhesive flow, the speed of rotation, and the nozzle size of the dispenser are all calibrated to achieve the desired thickness of the adhesive layer 110 without over-application.

The ends of the tube 100 are sealed prior to the adhesive layer 110 application to prevent the adhesive layer 110 from capping the ends, which could hinder the trap's performance and complicate disposal. This sealing of the tube 100 ends can be achieved through various methods in association with various relevant methods of production, such as heat sealing or using end caps that fit snugly onto the ends of the tube 100. The sealed ends also serve to maintain the structural integrity of the tube 100, ensuring that it does not collapse or deform during the coating process.

The controlled coating process, combined with the careful selection and testing of the adhesive compounds comprising the adhesive layer 110, results in a tube 100 that forms a key component of an embodiment that is reliable, effective, and safe for use in a variety of settings, and which can be strategically placed to capture pests, providing a non-toxic solution to pest control challenges in homes and businesses.

The final assembly of the tube 100 in an embodiment includes the attachment of a label or indicator that provides users with instructions for use and removal of the plastic cover 120. This label may also contain information about the adhesive layer 110's active life and any safety precautions necessary for handling the trap.

In additional embodiments of the invention, the insect trapping apparatus 500 may be configured in an extendible arrangement, wherein multiple apparati may be connected end-to-end to create extended insect trapping systems of customizable length and configuration.

In one extendible embodiment, the ends of the substantially cylindrical tube 100 are cut at an angle between approximately 30 to 60 degrees, preferably at a 45-degree angle. This angled cut allows one tube to slide partially into another tube in a telescoping arrangement. When inserted, the tube with the smaller effective diameter at the angled end slightly compresses as it enters the receiving tube. The adhesive layer 110 on the exterior surface of the inserted tube contacts and adheres to the interior surface of the receiving tube, creating a secure connection between the two apparati.

This extendible configuration provides several advantages. First, it allows for customization of trap length to suit various installation requirements. Second, the angled connections permit the creation of non-linear arrangements, such as curved paths or corner installations. For corner installations, the tubes may be positioned at approximately 45-degree angles relative to each other, enabling effective trapping around architectural corners or other non-linear surfaces. The external adhesive layer 110 not only secures the tubes to each other but also maintains the apparatus's ability to adhere to environmental surfaces, facilitating versatile placement options.

The extendible nature of the apparatus provides enhanced coverage for insect control while maintaining the discrete profile and environmental safety features of the individual units.

The manufacturing of tubes with angled ends for the telescoping connection in accordance with an exemplary embodiment requires specialized cutting processes to maintain precision and consistency. The angled cuts (between 30-60 degrees, preferably 45 degrees) are optimally achieved using a computer-controlled cutting system that maintains angular precision within ±1 degree. For production efficiency, tube stock may be cut using a rotary cutting mechanism with an adjustable angle blade, allowing continuous production of angled-end tubes at rates of 30-60 units per minute. Tubes intended for the receiving end undergo a secondary process where the interior surface within 25-30 mm of the edge receives a specialized treatment with a silicone-based or fluoropolymer release coating, applied at a thickness of 5-10 microns. This treatment creates a 'partial release zone' that allows initial insertion and alignment before the inserted tube advances past this zone and forms a permanent adhesive bond with the untreated interior surface. This manufacturing approach ensures that the tubes connect securely while allowing sufficient time for proper alignment during assembly by the end user.

To enhance user interaction and efficiency, an alternative embodiment of the trap integrates smart technology to provide real-time updates on the trap's status. This advanced version of the trap includes a sensor system embedded within or attached to the tube's 100 structure. The sensor is designed to detect when the adhesive layer 110 surface is covered by insects to a certain degree, which is indicative of the trap's success and capacity status.

In an exemplary implementation of the trap featuring such smart technology, the sensor could be an optical sensor that monitors changes in the surface texture of the adhesive layer 110, a weight sensor that detects increases in mass as insects are captured, or a capacitive sensor that senses when the adhesive layer 110 surface area is obstructed. Upon detecting that the adhesive layer 110 surface is covered to a predetermined threshold, the sensor activates a communication module within the trap.

In such example, the communication module is equipped with wireless connectivity, such as Wi-Fi, Bluetooth, NFC, or Zigbee, enabling it to send an alert to a connected device. This device could be a smartphone, tablet, or computer, where a dedicated application receives and processes the alert. The application would provide users with a notification that the trap has reached its capacity or effectiveness limit, signaling that it is time to check the trap and potentially replace it with a new one.

To provide this smart functionality, the trap's design incorporates a power source, such as a battery or energy-harvesting component, that supplies the necessary energy to the sensor and communication module. The power source is chosen for its longevity and compatibility with the trap's expected lifespan, ensuring that the smart features remain operational throughout the trap's effective period.

The inclusion of smart technology within the insect trap not only enhances the user experience by reducing the need for manual monitoring but also contributes to more efficient pest management. Users can be more responsive to the trap's status, ensuring that the trap is always functioning optimally. Additionally, the application could provide users with insights into peak insect activity times and patterns, further aiding in strategic trap placement and pest control planning.

Preferred Methods of Use

The preferred embodiment is an insect and pest catching apparatus 500 designed to effectively control insect and pest populations within a space by strategically placing the apparatus 500 coated in an adhesive layer 110 in areas where insects are known to travel or congregate. To employ the preferred embodiment, users should first identify common travel pathways, such as along baseboards, near entry points like windows or doors, in corners, or close to food sources in kitchens. Once these areas are pinpointed, the apparatus 500 can be positioned to intercept the insects and pests along such pathways in accordance with the preferred method of use.

The method of employing the preferred embodiment involves several steps to ensure maximum efficacy. Initially, the user removes the plastic cover 120 from the adhesive-coated tube 100 by tearing along the perforated edge 125 or tear strip, which exposes the sticky surface. Care should be taken to handle the tube 100 by the sealed ends to avoid contact with the adhesive layer 110. The user then takes the step of placing the tube 100 directly onto a surface or secures it in place using additional non-permanent fixtures if necessary, ensuring the tube 100 is stable and the adhesive layer 110 surface is unobstructed.

For comprehensive insect and pest control, the user may take the step of distributing multiple tubes 100 throughout the space, creating a barrier that insects and pests cannot bypass without becoming ensnared. The tubes' 100 discreet design, and ease of hiding, allows them to blend into the environment, making them less noticeable to occupants while remaining highly effective at capturing insects.

Over time, the tubes 100 will collect insects upon each adhesive layer 110, which can be easily monitored due to the transparent nature of the tube's 100 material in an embodiment. Once a tube 100 has accumulated a significant number of insects or the adhesive layer 110's effectiveness diminishes, it can be disposed of safely and replaced with a new one. The ease of disposal and replacement is a key feature of the preferred embodiment, allowing for continuous control of the insect population without the need for labor-intensive maintenance or cleaning.

The preferred embodiment's design and method of use is advantageous for several reasons. It provides a non-toxic alternative to chemical insecticides, making it safer for use in environments with children, pets, or food preparation areas. The adhesive layer 110 remains effective over an extended period, reducing the need for frequent monitoring or replacement. Additionally, the preferred embodiment's design allows for targeted placement, which can be adapted to specific insect behaviors and patterns within a given space.

While preferred embodiments of the present invention have been shown and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations or relative proportions set forth herein which depend upon a variety of conditions and variables. It should be understood that various alternatives to the embodiments of the invention described herein may be employed in practicing the invention. It is therefore contemplated that the invention shall also cover any such alternatives, modifications, variations or equivalents. It is intended that the following claims define the scope of the invention and that methods and structures within the scope of these claims and their equivalents be covered thereby.

I claim:

1. An insect trapping apparatus comprising:
a substantially cylindrical tube with enclosed ends,
an adhesive substance uniformly applied to the exterior surface of said cylindrical tube, and
a removable plastic cover conforming to the exterior surface of said cylindrical tube, said cover featuring a perforated edge for facilitated removal,
wherein said cylindrical tube is configured for placement in a variety of locations for the entrapment of insects upon contact with the adhesive substance,
wherein the cylindrical tube comprises at least one interlocking segment configured to interlock with another interlocking segment to extend the length of the apparatus, and
wherein the adhesive substance comprises a dual-use adhesive configured both to adhere the cylindrical tube to surfaces and to capture insects.

2. The insect trapping apparatus of claim 1, wherein the adhesive substance is a pressure-sensitive adhesive selected for its long-lasting tackiness and resistance to environmental factors.

3. The insect trapping apparatus of claim 1, wherein the cylindrical tube is constructed from a material selected from the group consisting of polymers, paper, organic materials, and inorganic materials.

4. The insect trapping apparatus of claim 1, wherein the removable plastic cover includes a pull-tab to initiate the removal of the cover from the adhesive substance.

5. A method for trapping insects comprising the steps of:
providing a substantially cylindrical tube with enclosed ends and an exterior surface coated with an adhesive substance,
protecting the adhesive substance with a removable plastic cover,
removing the plastic cover from the cylindrical tube by tearing along a perforated edge, placing the cylindrical tube in a location frequented by insects, and entrapping insects that come into contact with the adhesive substance on the exterior surface of the cylindrical tube,
wherein the method further comprises connecting multiple cylindrical tubes together to increase the adhesive surface area, and
wherein the adhesive substance comprises a dual-purpose adhesive that both secures the cylindrical tube to surfaces and captures insects upon contact.

6. The method of claim 5, wherein the step of placing the cylindrical tube includes positioning the tube in areas including but not limited to baseboards, beneath appliances, and cabinet interiors.

7. The method of claim 5, further comprising the step of customizing the length of the cylindrical tube to fit the intended placement location.

8. The method of claim 5, further comprising the step of disposing of the cylindrical tube after it is filled with trapped insects, ensuring no direct contact with the adhesive substance during disposal.

9. The insect trapping apparatus of claim 1, wherein at least one end of the cylindrical tube is cut at an angle between 30 and 60 degrees relative to a longitudinal axis of the tube.

10. The insect trapping apparatus of claim 9, wherein the angle is approximately 45 degrees.

11. The insect trapping apparatus of claim 1, wherein the interlocking segments comprise a first tube segment having at least one angled end configured to partially slide into a second tube segment, wherein the exterior adhesive of the first tube segment contacts and adheres to an interior surface of the second tube segment to secure the segments together.

12. The insect trapping apparatus of claim 11, wherein the first tube segment is configured to slightly compress when inserted into the second tube segment to enhance adhesion between the segments.

13. The insect trapping apparatus of claim 1, wherein the cylindrical tube segments are configured to be arranged at angles relative to each other for placement around corners.

14. The insect trapping apparatus of claim 13, wherein the angle is approximately 45 degrees.

15. The insect trapping apparatus of claim 1, further comprising a telescoping arrangement between two tube segments, wherein a portion of a first tube segment with the exterior adhesive slides into and adheres to an interior surface of a second tube segment.

16. A system of extendible insect trapping apparati comprising:
- a plurality of substantially cylindrical tubes, each tube having:
    - enclosed ends, wherein at least one end is cut at an angle between 30 and 60 degrees relative to a longitudinal axis of the tube;
    - an adhesive substance uniformly applied to an exterior surface of said cylindrical tube; and
    - a removable plastic cover conforming to the exterior surface of said cylindrical tube;
        - wherein the plurality of cylindrical tubes are configured to connect to one another by sliding a portion of one tube into another tube such that the exterior adhesive of the inserted tube contacts and adheres to an interior surface of the receiving tube, thereby creating an extended insect trapping construct.

\* \* \* \* \*